(12) United States Patent
Hill

(10) Patent No.: US 9,688,337 B2
(45) Date of Patent: Jun. 27, 2017

(54) BIKE CHAIN CLEANING TOOL

(71) Applicant: Lloyd R Hill, Santa Ana, CA (US)

(72) Inventor: Lloyd R Hill, Santa Ana, CA (US)

( * ) Notice: Subject to any disclaimer, the term of this patent is extended or adjusted under 35 U.S.C. 154(b) by 18 days.

(21) Appl. No.: 14/922,430

(22) Filed: Oct. 26, 2015

(65) Prior Publication Data

US 2017/0113751 A1 Apr. 27, 2017

(51) Int. Cl.
*F16H 57/00* (2012.01)
*B62J 99/00* (2009.01)

(52) U.S. Cl.
CPC ........ *B62J 99/00* (2013.01); *B62J 2099/0066* (2013.01); *B62J 2099/0093* (2013.01)

(58) Field of Classification Search
CPC .... B62J 99/00; B62J 99/0066; B62J 99/0093; B08B 7/00; B61K 3/00; B62M 9/00
USPC ............................................ 474/92; 184/15.1
See application file for complete search history.

(56) References Cited

U.S. PATENT DOCUMENTS

| | | | | |
|---|---|---|---|---|
| 603,654 A * | 5/1898 | Norris | ...................... | B62J 31/00 144/242.1 |
| 635,778 A * | 10/1899 | Hudelson | ................ | B27B 17/08 15/246 |
| 648,724 A * | 5/1900 | Cole | ........................ | B27B 17/08 15/256.6 |
| 4,578,120 A * | 3/1986 | Chiarella | ................. | B62J 31/00 134/40 |
| 4,593,923 A * | 6/1986 | Thalmann | ................ | B62J 31/00 15/256.6 |
| 4,827,555 A * | 5/1989 | Fruit | ........................ | A46B 9/02 15/160 |
| 5,020,637 A * | 6/1991 | Hoenselaar | .......... | B65D 83/303 184/15.1 |
| 5,484,038 A * | 1/1996 | Rowell | ..................... | B62J 31/00 184/15.1 |
| 6,257,369 B1 * | 7/2001 | Pesl | .......................... | B62J 31/00 184/15.1 |
| 6,942,409 B2 * | 9/2005 | Barbieri | ............... | A46B 5/0012 184/15.1 |
| 8,181,747 B2 * | 5/2012 | Feldstein | ................ | B08B 3/022 134/15 |
| 8,186,921 B2 * | 5/2012 | Lowman | ............ | F01M 11/0408 184/1.5 |
| 8,573,362 B2 * | 11/2013 | Nagele | ..................... | B62J 31/00 184/15.1 |

(Continued)

*Primary Examiner* — William E Dondero
*Assistant Examiner* — Mark K Buse
(74) *Attorney, Agent, or Firm* — Morland C. Fischer

(57) ABSTRACT

A no hands bike chain cleaning tool to clean the chain of a bicycle that is driven through the cleaning tool in response to a rotation of the bicycle pedals. The cleaning tool has a hook projecting from the rear thereof to engage the drop down arm of the rear derailleur of the bicycle and thereby prevent a displacement of the cleaning tool away from the rear derailleur when the pedals are rotated in a first direction. The rear of the cleaning tool has an inwardly extending depression to receive therewithin an edge of the drop down arm and thereby block the cleaning tool from moving into the rear gear wheel when the pedals are rotated in an opposite direction. The cleaning tool has a top cover and a bottom tray that are detachably connected to one another by the actuation of a push-button so as to surround the bicycle chain to be cleaned.

16 Claims, 4 Drawing Sheets

(56) References Cited

U.S. PATENT DOCUMENTS 9,028,351 B1\* 5/2015 Rodriguez .............. F16H 57/05
 474/91
2014/0213399 A1\* 7/2014 Varghese ................ F16H 57/05
 474/92

\* cited by examiner

BIKE CHAIN CLEANING TOOL

BACKGROUND OF THE INVENTION

1. Field of the Invention

This invention relates to a hands-free bike chain cleaning tool to scrub and clean a bike chain being driven through the cleaning tool in response to the bike pedals being rotated forwards or backwards at a high speed. A displacement of the cleaning tool relative to the rear derailleur of the bike is avoided to enable the bike chain to be cleaned with the biker's hands remaining free and not being required to hold the cleaning tool in place.

2. Background Art

Tools are known by which to surround and clean the chain of a bicycle that is driven through the tool in response to a rotation of the bike pedals. However, when a conventional bike cleaning tool is used to clean the bike chain, the pedals are limited to a slow speed rotation in the backwards direction. Otherwise, the chain surrounded by the cleaning tool has been known to twist and become unstable. Moreover, when the pedals are rotated in the forwards direction the cleaning tool is typically displaced with the chain and moved towards the rear derailleur of the bike at which to strike and possibly damage the gear teeth. In this same regard, if the bike chain is to be cleaned while the pedals are rotated in a forwards direction, the bike is usually mounted on a stand in order to lift the wheels off the ground. Whether the pedals are rotated forwards or backwards, the biker is required to use one or both of his hands to hold the cleaning tool in place so that it will not move with the chain towards the front or the rear of the bike. To this end, some bike cleaners are known to have handles extending therefrom to be held in a hand of the biker.

In many cases, the conventional chain cleaning tool includes a top and a bottom that are detachably connected together around the bike chain by means of latches or buckles. Consequently, both of the biker's hands are often required to assemble and disassemble the cleaning tool on and off the chain. What is more, in cases where the cleaning tool is filled with a cleaning solution, the cleaning solution has been known to spill out during the attachment of the cleaning tool around the chain.

Therefore, what would be desirable is an improved bike chain cleaning tool which can be quickly and easily attached around the chain to be cleaned such that the cleaning tool will be held in place to enable a hands-free cleaning operation. It would also be desirable for the improved bike chain cleaning device to be able to quickly clean the chain while rotating the bike pedals at high speed in both the forwards and backwards directions and without having to mount the bike on a stand or requiring that the biker hold the cleaning tool in his hands.

SUMMARY OF THE INVENTION

In general terms, a bike chain cleaning tool is disclosed to scrub and clean a bike chain being driven through the cleaning tool in response to the bike pedals being rotated at high speed in both forwards and backwards directions. The bike chain cleaning tool includes a top cover and a bottom tray that are detachably connected together around the chain to be cleaned. The bike chain is quickly and reliably cleaned by sets of side bristles that extend radially from upper and lower bristle support wheels. A pair of lower bristle support wheels are mounted for rotation within the bottom tray of the cleaning tool, and an upper bristle support wheel is mounted for rotation within the top cover so as to lie above and between the pair of lower bristle support wheels. Sets of opposing horizontal side bristles and a set of vertical bottom bristles are located at the rear of the bottom tray. The bike chain is pulled between the side bristles and over the bottom bristles so that the sides and bottom of the bike chain will be cleaned before the chain reaches the side bristles carried by the upper and lower bristle support wheels.

The top of the bike cleaning tool has a spring-biased push-button located at the front thereof and a pair of push-button release anus depending downwardly from the push-button. The bottom tray of the cleaning tool has a pair of push-button locking arms standing upwardly at the from thereof. The end of each of the push-button release arms and the push-button locking arms has a locking tab. The locking tabs of the push-button release arms are moved into interlocking engagement with the locking tabs of the push-button locking arms such that the top cover of the cleaning tool is detachably connected to the bottom tray. The spring-biased push-button is responsive to as pushing force applied thereto to cause the locking tabs of the push-button release arms that depend from the push-button to move out of their interlocking engagement with the locking tabs of the push-button locking arms so as to enable the top cover of the cleaning tool to be detached from the bottom tray.

A hook extends from the rear of the bottom tray of the bike chain cleaning tool to be attached to the rear derailleur at the side opening formed through the drop down arm thereof. The hook holds the cleaning tool in place without the biker having to use his hands when the bike pedals are rotated in a backwards direction so that the cleaning tool will not move away from the rear derailleur. A depression is formed at the rear of the bottom tray so as to extend inwardly of the bike chain cleaning tool. The depression is sized and shaped to receive therewithin the leading edge of the drop down side arm of the rear derailleur to thereby prevent the cleaning tool from moving into the gear wheel so that the biker will not have to use his hands to hold the cleaning tool when the bike pedals are rotated in a forwards direction.

DESCRIPTION OF THE PREFERRED EMBODIMENT

Figure 1:
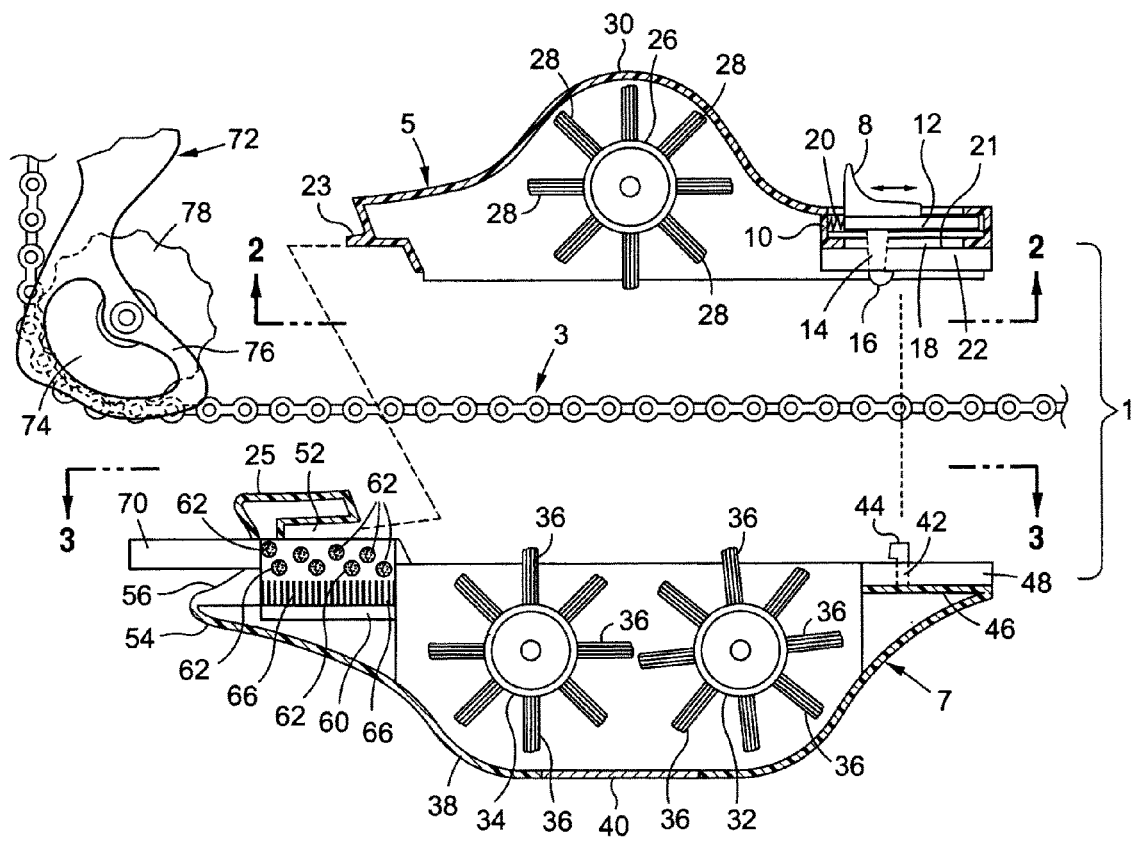
FIG. 1 shows the top cover and the bottom tray of a bike chain cleaning tool according to a preferred embodiment of this invention.
Figure 2:
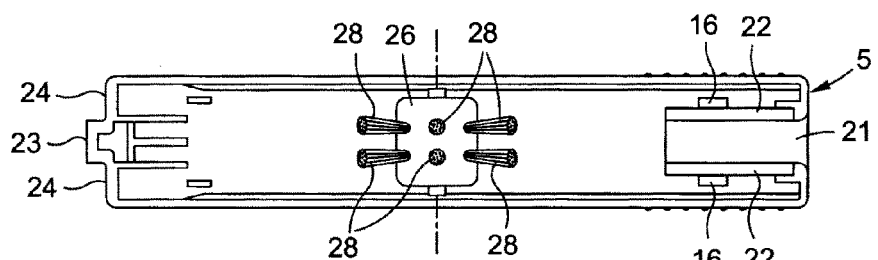
FIG. 2 shows the top cover of the bike chain cleaning tool when viewed in the direction of lines 2-2 of FIG. 1.
Figure 3:
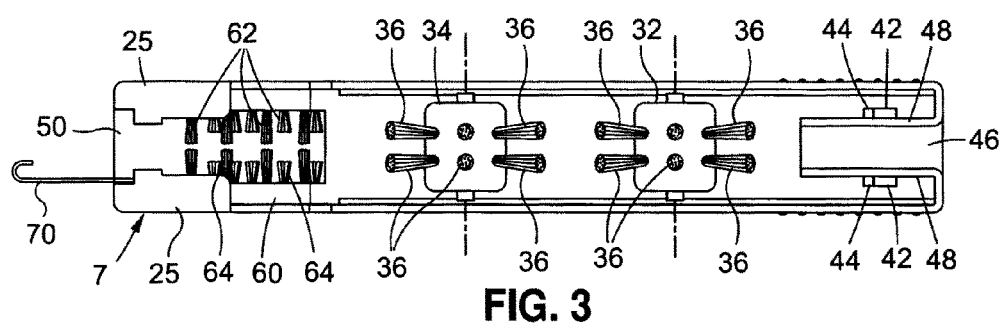
FIG. 3 shows the bottom tray of the bike chain cleaning tool when viewed in the direction of lines 3-3 of FIG. 1.

A hands-free bike chain cleaning tool 1 according to a preferred embodiment of this invention is described while referring initially to FIGS. 1-3 of the drawings. As will soon be explained, the cleaning tool 1 permits the usual chain 3 of a road bike or a mountain bike to be quickly and reliably cleaned while the bike pedals are rotated either forwards or backwards. As will also be explained, the cleaning tool 1 is advantageously held in place around the bike chain 3 while both hands of the biker remain free and without the biker having to otherwise use his hands to hold onto the cleaning tool to prevent a displacement of the tool as is common to conventional bike chain cleaners.

The bike chain cleaning tool 1 includes a top cover 5 and a bottom tray 7 that are preferably molded from a durable plastic material. The top cover 5 and the bottom tray 7 are detachably connected to one another in order to surround the chain 3 to be cleaned. A spring biased push-button 8 is surrounded by and slidable through a push-button enclosure 10 that is located below the top cover 5 at the front thereof. The push-button 8 is mounted on a push-button carriage 12. Depending downwardly from the push-button carriage 12 is a pair of spaced, parallel aligned push-button release arms 14. A front facing locking tab 16 projects from the bottom of each push-button release arm 14 (best shown in FIG. 2). The pair of push-button release arms 14 extend downwardly from the push-button carriage 12 through an opening 18 in the bottom of the push-button enclosure 10 which surrounds the push-button 8.

A spring 20 extends between the push-button enclosure 10 and the push-button carriage 12. The spring 20 is normally expanded so as to urge the push-button carriage 12 and the pair of push-button release arms 14 which depend therefrom to slide in a forward direction through, the push-button enclosure 10 towards a tray locking position. The spring biased push-button is responsive to as rearward pushing three applied thereto by the biker to cause the push-button carriage 12 on which the push-button 8 is mounted to slide in a rearward direction through the push-button enclosure 10. A rearward movement of the push-button carriage 12 causes a corresponding rearward movement of the pair of push-button release arms 14 to a tray unlocking position. At the same time, the spring 20 is compressed by the rearward moving push-button carriage 12 and energy is stored. However, when the rearward pushing force being applied by the biker to the spring biased push-button 8 is terminated, the spring 20 will release its stored energy and return to its normally expanded configuration to cause push-button 8 and the push-button release arms 14 to automatically move forward to the tray locking position.

The push-button enclosure 10 at the hunt of the to cover 5 is seated atop a flat upper chain track 21. As is best shown in FIGS. 1 and 2, a pair of parallel aligned guide walls 22 extend downwardly from opposite sides of the upper chain track 21 so that the pair of push-button release arms 14 are positioned adjacent respective ones of the pair of guide walls 22. Thus, as the spring-biased push-button 8 slides with the push-button carriage 12 back and forth through the push-button enclosure 10 between the tray locking and unlocking positions, the pair of push-button release arms 14 and the front facing locking tabs 16 thereof will slide along the outside of the guide walls 22.

Projecting outwardly from the rear of the top cover 5 of the bike chain cleaning tool 1 is a locking tongue 23. A pair of locking edges 24 are recessed relative to and be at opposite sides of the locking tongue 23 at the rear of the cleaning tool 1 (best shown in FIG. 2). As will soon be explained, the locking edges 24 are removably received below respective ones of a pair of locking edge guides 25 (best shown in FIG. 3) which stand upwardly from and bend over the top cover 5.

An upper bristle support wheel 26 is mounted for rotation on an axle that runs between opposite sides of the to cover 5 of the bike chain cleaning tool 1 (best shown in FIG. 2). Sets of side bristles 28 are carried by and project radially outward from the upper bristle support wheel 26. An upwardly curved hump 30 rises from the top cover 5 about midway between the front and rear ends thereof. The curved hump 30 of top cover 5 is sized and shaped to accommodate therebelow the sets of side bristles 28 which are caused to rotate with the upper bristle support wheel 26 to engage and clean the bike chain 3 when the chain is driven through the cleaning tool 1 in response to the bike pedals being rotated forwards or backwards.

The bike chain cleaning tool 1 also includes a pair of lower bristle support wheels 32 and 34 arranged side-by-side one another and mounted for rotation on axles that run between opposite sides of the bottom tray 7 (best shown in FIG. 3). Sets of side bristles 36 are carried by and project radially outward from each of the lower bristle support wheels 32 and 34. A dish-shaped fluid basin 38 bends downwardly between the front and rear of the bottom tray 7. The dish-shaped fluid basin 38 is sized and shaped to accommodate the sets of side bristles 36 which are caused to rotate with the lower bristle support wheels 32 and 34 to engage and clean the bike chain 3 when the chain is driven through the cleaning tool 1 in response to the bike pedals being rotated forwards or backwards. In addition, the dish-shaped fluid basin 38 will also accommodate a chain cleaning liquid with which the bottom tray 7 is filled prior to the bike chain 3 being cleaned and while the top cover 5 and bottom tray 7 of cleaning tool 1 are detached from one another.

As is best shown in FIG. 1, a magnet 40 is embedded within the dish-shaped fluid basin 38 at the bottom of the plastic bottom tray 7 of cleaning tool 1. The magnet 40 is located below the bike chain 3 to collect and retain any metal shavings that are removed from the chain during the cleaning operation when the chain is driven through the cleaning tool 1. Such metal shavings can be easily removed from the cleaning tool 1 at the conclusion of the cleaning operation and after the top cover 5 and the bottom tray 7 are detached from one another and the chain cleaning liquid has been poured out from the bottom tray 7.

Located within and standing upwardly from the front of the bottom tray 7 of the bike chain cleaning tool 1 is a pair of spaced, parallel aliened and stationary push-button locking arms 42 (best shown in FIG. 3). A rear facing locking to 44 projects from the top of each stationary push-button locking arm 42. In this case, the front facing locking tabs 16 that project from the pair of sliding push-button release arms 14 of the top cover 5 and the rear facing locking tabs 44 that project from the pair of stationary push-button locking arms 42 of the bottom tray 7 extend in opposite directions to facilitate the top cover 5 and the bottom tray 7 being detachably connected together to assembly the bike chain cleaning tool 1 around the bike chain 3 in a manner that will soon be described.

A flat lower chain track 46 is retained below the front of the bottom tray 7. As is best shown in FIGS. 1 and 3, a pair of parallel aligned walls 48 extend outwardly from opposite sides of the lower chain track 46 so that the pair of stationary push-button locking arms 42 are held adjacent the outside of respective ones of the pair of side walls 48. The upper chain track 21 of the top cover 5 and the lower chain track 46 of the bottom tray 7 are aligned in spaced, opposite facing alignment with one another to create a passage for the chain 3 to exit or enter the front of the cleaning tool 1.

The previously referred to pair of spaced locking edge guides 25 stand upwardly from the rear of the bottom tray 7 of the cleaning tool 1. A locking tongue channel 50 (best shown in FIG. 3) is located between the pair of locking edge guides 25. The upstanding locking edge guides 25 bend forwards and over the top of the bottom tray 7 so that a locking edge receiving gap 52 is established below each of the bent over edge guides 25. The locking edge receiving gaps 52 are sized to receive therein respective ones of the locking edges 24 which lie at the rear of the bottom tray 7 and at opposite sides of the locking tongue 23. That is, the locking tongue 23 is pushed into the locking tongue channel 50 while the locking edges 24 of the top cover 5 are slidably received within the locking edge gaps 52 lying below the bent over locking edge guides 25 of the bottom tray 7 to further facilitate the top cover 5 and the bottom tray 7 being detachably connected together to assemble the bike chain cleaning tool 1.

Figure 4:
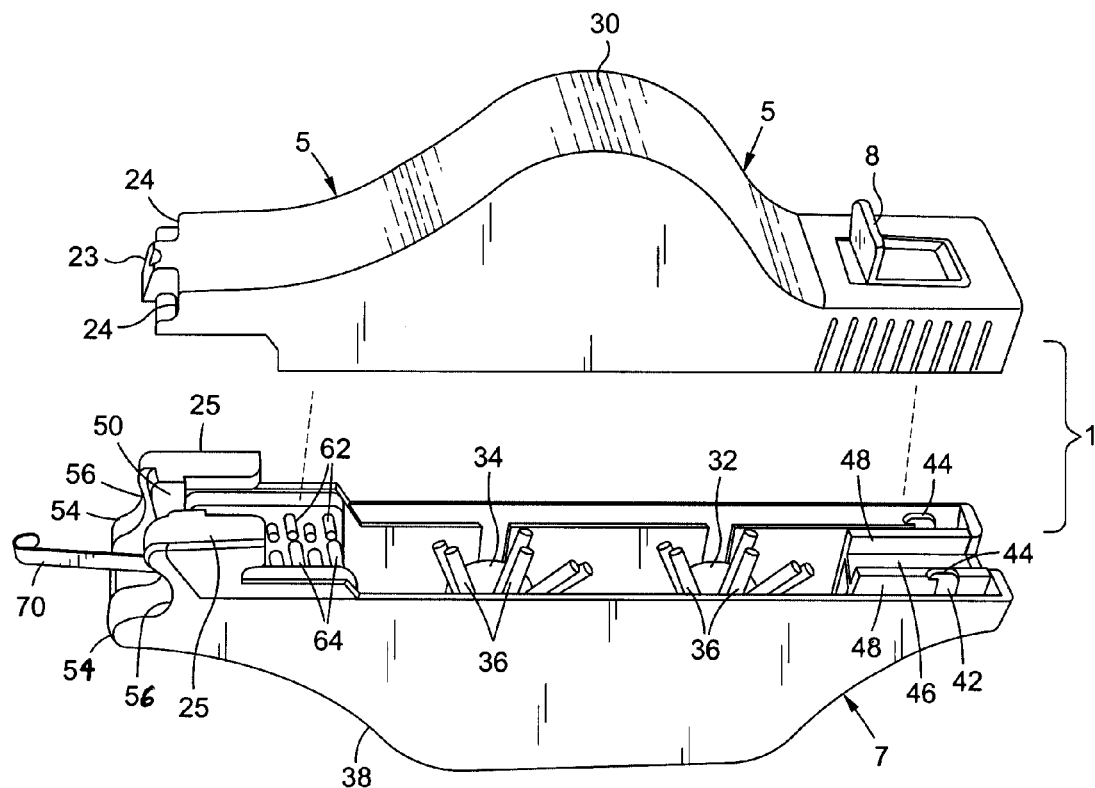
FIG. 4 is a perspective view of the bike chain cleaning tool with the to cover thereof being detachably connected to the bottom tray.
Figure 5:
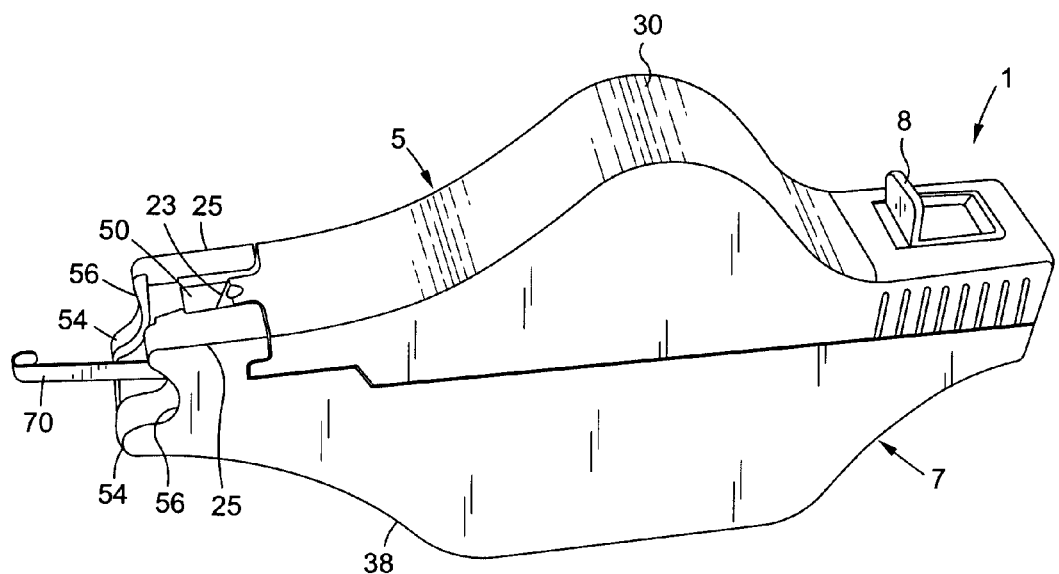
FIG. 5 is a perspective view of the bike chain cleaning tool after the top cover thereof has been connected to the bottom tray.

As an important detail of the bike chain cleaning tool 1, a rounded nose 54 projects rearwardly and coextensively outwards from the dish-shaped fluid basin 38 at each side of the bottom tray 7. Accordingly, as pair of depressions 56 are formed side-by-side one another at the rear of the bottom tray 7 above the outwardly projecting noses 54 thereof. As is best shown in FIGS. 4 and 5, the depressions 56 extend inwardly of the bottom tray 7 of the bike chain cleaning tool 1. The advantage of the pair of inwardly extending depressions 56 formed in the bottom tray 7 will be explained in greater detail hereinafter when referring to FIGS. 6-8.

A bristle channel 60 is located within the rear of the bottom tray 7 of the bike chain cleaning tool 1. First and second sets of horizontal side bristles 62 and 64 project from opposite sides of the bristle channel 60 so as to face one another in spaced axial alignment. To improve their chain cleaning efficiency, the bristles 62 and 64 from the first and second sets thereof have different lengths. A set of vertical bottom bristles 66 (best shown in FIG. 1) stand upwardly from the bottom of the bristle channel 60 so as to lie below the opposing sets of horizontal side bristles 62 and 64. The sets of horizontal side and vertical bottom bristles 62, 64 and 66 cooperate with one another (best shown in FIGS. 7 and 8) to engage and clean the sides and bottom of the bike chain 3 when the chain is driven therebetween in response to the bike pedals being rotated forwards or backwards.

As another important feature of the bike chain cleaning tool 1, a hook 70 projects outwardly from the rear of the bottom tray 7. The hook 70 is preferably a thin strip of flexible metal having a bend at one end thereof and being attached at the flat opposite end to the bottom tray 7. The purpose and advantage of the hook 70 will be explained while referring hereinafter to FIGS. 7 and 8.

FIG. 4 of the drawings shows the top cover 5 of the bike chain cleaning tool 1 to be held in one hand of the biker and positioned above the bottom tray 7 to be held in the biker's other hand and detachably connected to the top cover without spilling liquid from the fluid basin 38 of bottom tray 7. FIG. 5 of the drawings shows the top cover 5 and the bottom tray 7 detachably connected together in order to assembly the cleaning tool 1. To complete the assembly of cleaning tool 1 and referring concurrently to FIGS. 1-5 of the drawings, the rear of the top cover 5 is initially mated to the rear of the bottom tray 7. More particularly, the locking tongue 23 of the top cover 5 is moved into the locking tongue channel 50 of the bottom tray 7, and the locking edges 24 at opposite sides of the locking tongue 23 of the top cover 5 are slidably received within the locking edge receiving gaps 52 (best shown in FIG. 1) below respective ones of the pair of locking edge guides 25 of the bottom tray 7.

Next, the front of the top cover 5 is pushed downwardly towards and mated to the front of the bottom tray 7. To accomplish the foregoing, the sliding push-button release arms 14 (of FIG. 1) which depend downwardly from and slide with the spring biased push-button 8 of the top cover 5 are moved towards and into contact with the stationary push-button locking arms 42 which stand upwardly from the bottom tray 7. The push-button release arms 14 and the push-button locking arms 42 are slightly offset relative to one another such that the front facing locking tabs 16 (also of FIG. 1) of the push-button release arms 14 are snapped into detachable locking engagement with the rear facing locking tabs 44 of the push-button locking arms 42 by which the push-button release arms are in the aforementioned tray locking position and the top cover 5 is held over and closed against the bottom tray 7.

When it is necessary to separate the top cover 5 from the bottom tray 7 and thereby open the bike chain cleaning tool 1, the biker applies a rearward pushing force to the spring biased push-button 8. In this case, the biker can hold the bottom tray 7 in one hand and use his other hand to conveniently and easily actuate the push-button 8. As was previously disclosed, the push-button release arms 14 of the top cover 5 slide with the push-button 8 rearwardly relative to the stationary push-button locking arms 42 of the bottom tray 7. At the same time, the spring 20 (of FIG. 1) is compressed. Accordingly, the push-button release arms 14 are now moved to the tray unlocking position, and the locking tabs 16 of the push-button release arms 14 are moved out of their former locking engagement with the locking tabs 44 of the push-button locking arms 42 to enable the biker to pull the top cover 5 upwardly and off the bottom tray 7.

When the top cover 5 has been separated from the bottom tray 7 and the user terminates the pushing force against the push-button 8, the spring 20 will expand and cause the push-button 8 to automatically move forwardly and the push-button release arms 14 to return to their initial tray locking position at the front of the top cover 5.

Figure 6:
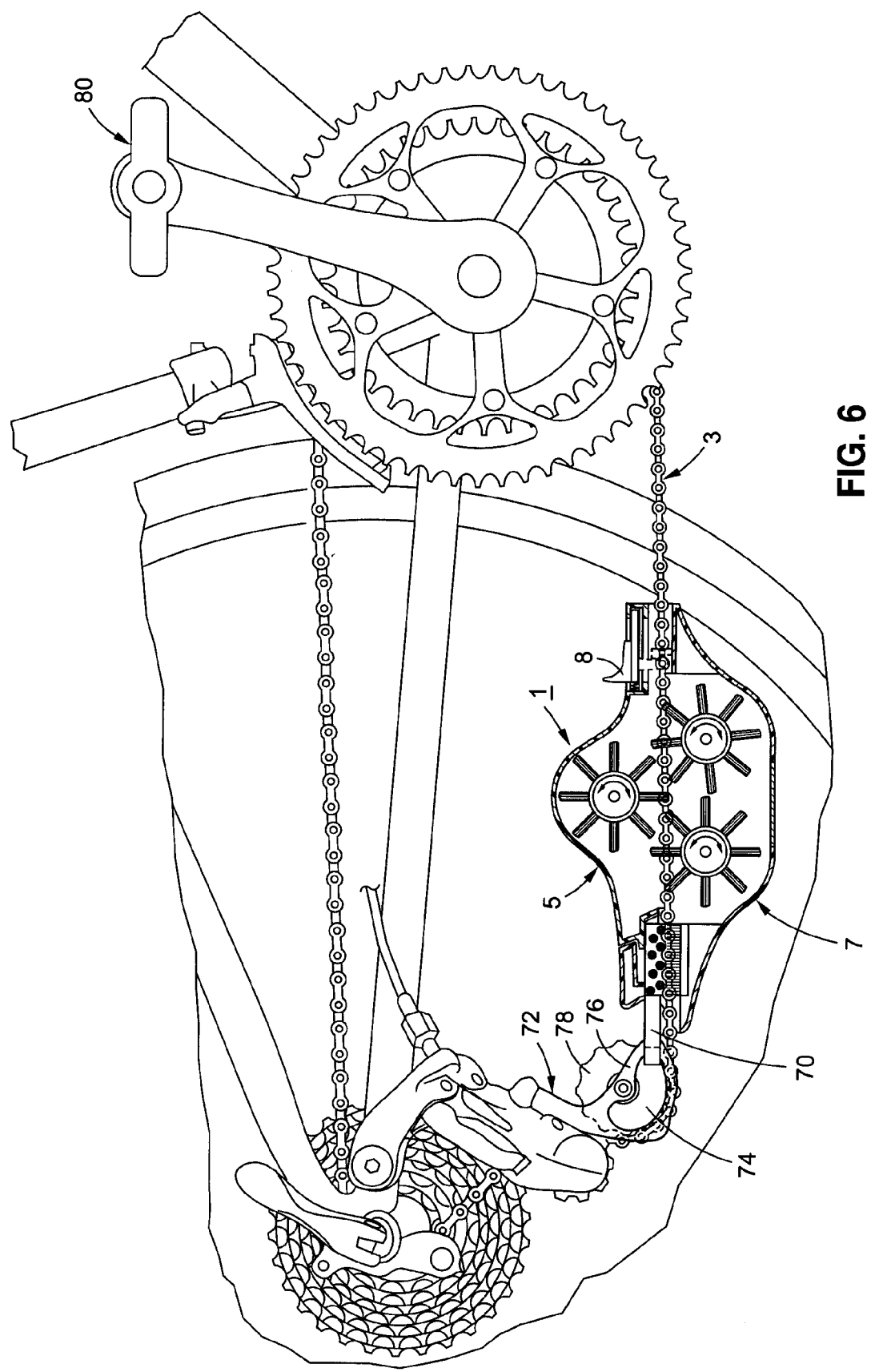
FIG. 6 shows the bike chain cleaning tool surrounding the bike chain to be cleaned by driving the chain through the cleaning tool in response to a rotation of the bike pedals.
Figure 7:
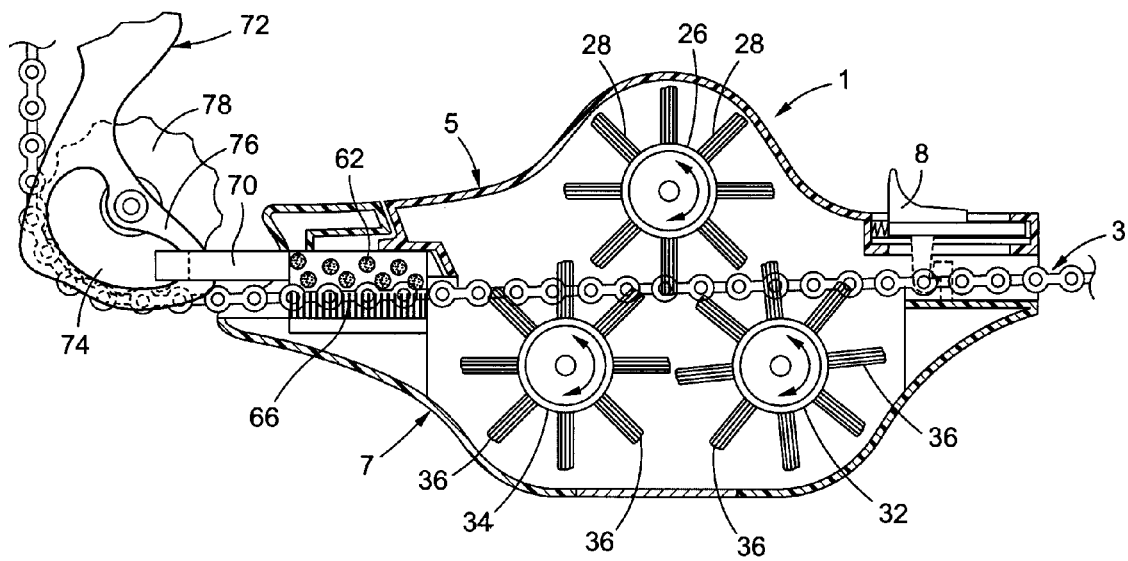
FIG. 7 shows a hook extending from the rear of the bike chain cleaning tool to be attached to the rear derailleur of the bike to prevent the cleaning tool from moving away from the rear derailleur when the bike pedals are rotated backwards.
Figure 8:
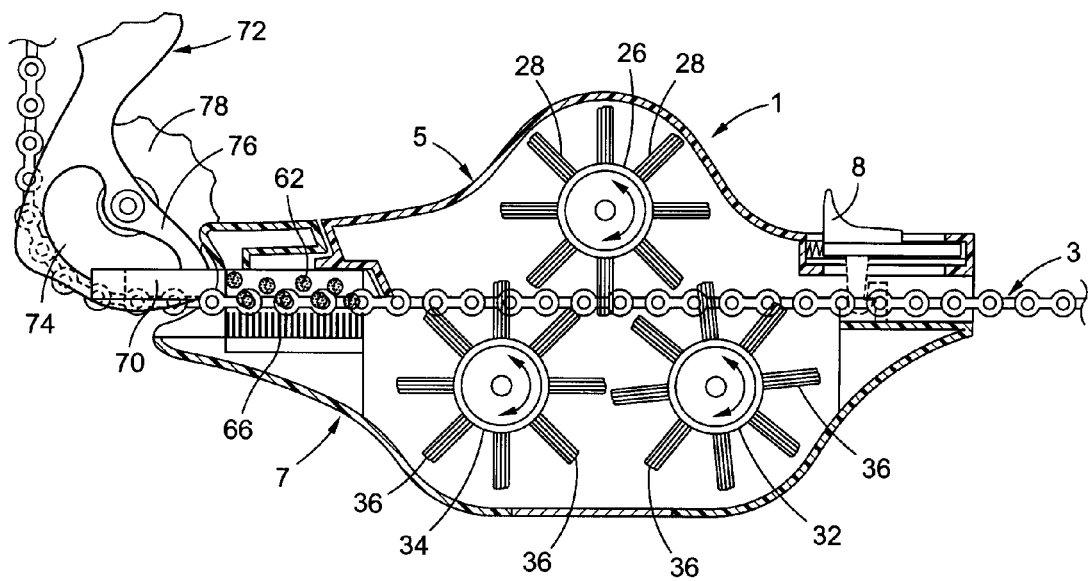
FIG. 8 shows a depression formed at the rear of the bike chain cleaning tool to receive therewithin the rear derailleur to prevent the cleaning tool from moving towards the rear derailleur when the bike pedals are rotated forwards.

Referring concurrently now to FIGS. 6-8 of the drawings, the bike chain cleaning tool 1 is shown lying, in surrounding engagement with the bike chain 3 so that the bike chain can be scrubbed and cleaned when the bike pedals are rotated either forwards or backwards and with the biker having both of his hands free and not having to hold onto and prevent a displacement of the cleaning tool 1 as the chain is driven through the tool. That is, the top cover 5 is closed over and located against the bottom tray 7 as previously disclosed with the bike chain 3 running therebetween. The bike chain 3 is scrubbed and cleaned by its contact with the side bristles 28 and 36 that are carried by the upper and lower bristle support wheels 26, 32 and 34 which are rotated in response to the bike chain being driven through the cleaning tool 1. The upper and lower bristle support wheels 26, 32 and 34 are arranged at the corners of a triangle, such that the upper support wheel 28 of the top cover 5 is located above and between the lower support wheels 32 and 34 of the bottom tray 7.

The bike chain 3 is also scrubbed and cleaned by its contact with the opposing sets of horizontal side bristles 62 and 64 and the set of upstanding vertical bottom bristles 66 as the chain is driven through the bike chain cleaning tool 1. That is, the bike chain 3 is pulled between the opposing sets of horizontal side bristles 62 and 64 and over the set of vertical bottom bristles 66 which lie below the horizontal side bristles 62 and 64 at the rear of the bottom tray 7. The inclusion of the side and bottom bristles 62, 64 and 66 at the rear of the bottom tray 7 enables the sides and button of the bike chain 3 to be scrubbed and any large buildup of dirt removed before the chain reaches the side bristles 28 and 36 that are carried by the rotatable upper and lower bristle support wheels 26, 32 and 34.

Still referring to FIGS. 6-8 of the drawings, the bike chain cleaning tool 1 is shown surrounding the bike chain 3 which will be quickly and reliably cleaned as the chain is driven through the cleaning tool and past the cleaning bristles 28, 36, 62, 64 and 66 in response to the bike pedals (one of which being shown and designated 80 in FIG. 6) being rotated forwards or backwards. As was previously explained, the flat end of hook 70 is attached to the rear of the bottom tray 7 of the cleaning tool 1. The opposite bent end of the hook 70 is coupled to the rear derailleur 72 that is common to most mountain and road bikes. In particular, the bend of the hook 70 is attached to the rear derailleur 72 at the side opening 74 that is formed through the drop down arm 76 thereof. By virtue of the hook 70 being attached to and gripping the rear derailleur 72 of the bike as is best shown in FIG. 7, a movement of the cleaning tool 1 with the bike chain 3 away from the rear derailleur will be avoided. In other words, the cleaning tool 1 will be held in place by the hook 70 when the bike pedals 80 are rotated in a backwards direction and while leaving both hands of the biker free. Moreover, the wheels of the bike need not be lifted off the ground so that the use of a stand is likewise avoided.

As was also previously explained, a pair of inwardly extending depressions 56 are formed side-by-side one another at the rear of the bottom tray 7 of the bike chain cleaning tool 1. The depressions 56 (best shown in FIGS. 4 and 5) are sized and shaped to receive therewithin the leading edge of the drop down arm 76 of the rear derailleur 72. Therefore, any additional movement of the cleaning tool 1 with the bike chain 3 will be blocked so as to avoid twisting of the tool and contact with the teeth of the gear wheel 78 that is coupled to the rear derailleur at the drop down arm 76 thereof. In other words, the cleaning tool 1 will be held in place without the biker having to use his hands by virtue of the dovetailing of the rear derailleur 72 to the cleaning tool 1 at the depressions 56 when the bike pedals 80 are rotated at high speed in a forwards direction.

The invention claimed is:

1. A combination comprising:
   a bicycle having a front and rear and including pedals, a bicycle chain driven by a rotation of the pedals, a derailleur attached to the rear of the bicycle and having a drop down arm coupled to a rotatable gear over which the bicycle chain extends, and the drop down arm having an opening extending therethrough; and
   a bicycle chain cleaning tool including:
   a top having a front and a rear, a push-button, and a push-button release arm extending downwardly from said push-button;
   a bottom having a front and a rear and an upwardly extending push-button locking arm positioned to releasably engage the push-button release arm extending downwardly from the push-button at the top of said bicycle chain cleaning tool so that the top of said cleaning tool is detachably connected to the bottom thereof, said push-button being responsive to a pushing force applied thereto to reposition said downwardly extending push-button release arm to cause said push-button release arm to move relative to and out of its releasable engagement by said upwardly extending push-button locking arm whereby the top of said bicycle chain cleaning tool is disconnected from the bottom thereof;
   at least one set of bristles located in one of the top or the bottom of said cleaning tool, said top being detachably connected to said bottom around the bicycle chain, and the bicycle chain moving through said cleaning tool so as to be engaged and cleaned by the at least one set of bristles in response to the rotation of the bicycle pedals; and
   an attachment by which to attach said bicycle cleaning tool to the derailleur of the bicycle to prevent a displacement of said cleaning tool relative to the derailleur when the bicycle pedals are rotated in a first direction and the bicycle chain moves through said cleaning tool in a corresponding first direction.

2. The combination recited in claim 1, wherein the attachment by which to attach said bicycle cleaning tool to the derailleur is a hook extending outwardly from the rear of one of the top or the bottom of said bicycle cleaning tool.

3. The combination recited in claim 2, wherein said hook is attached to the derailleur at the opening extending through the drop down arm thereof.

4. The combination recited in claim 1, wherein there is a depression formed at the rear of one of the top or the bottom of said bicycle cleaning tool so as to extend inwardly of said cleaning tool, said depression having a size and shape to receive therewithin a portion of the drop down arm of the derailleur to prevent a displacement of said cleaning tool relative to the derailleur when the bicycle pedals are rotated in an opposite direction and the bicycle chain moves through said cleaning tool in a corresponding opposite direction.

5. The combination recited in claim 1, said bicycle chain cleaning tool further including an upper bristle support wheel mounted for rotation within the top of said cleaning tool and having a first set of bristles projecting therefrom; and a pair of lower bristle support wheels mounted for rotation within the bottom of said cleaning tool and having respective second and third sets of bristles projecting therefrom, said first, second and third sets of bristles engaging and cleaning the bicycle chain moving through said cleaning tool in response to the rotation of the bicycle pedals, and said at least one set of bristles being one of said first, second or third sets of bristles.

6. The combination recited in claim 5, wherein said upper bristle support wheel mounted for rotation within said top is located above and between said pair of lower bristle support wheels mounted for rotation within said bottom such that said upper and lower bristle support wheels are arranged in a triangular configuration with one another.

7. The combination recited in claim 5, said bicycle chain cleaning tool further including a fourth set of bristles standing vertically upward within the rear of the bottom of said cleaning tool and a fifth set of bristles lying above said vertically upstanding fourth set of bristles and extending horizontally within the rear of the bottom of said cleaning tool, the bicycle chain moving through said cleaning tool and between said fourth and fifth sets of bristles in response to the rotation of the bicycle pedals.

8. The combination recited in claim 1, said bicycle chain cleaning tool further including a magnet located within the bottom of said cleaning tool between the front and rear thereof to retain metal shavings that are removed from the bicycle chain when the chain moves through said cleaning tool and is engaged and cleaned by said at least one set of bristles.

9. The combination recited in claim 1, wherein there is a locking tab carried by each of the downwardly extending push-button release arm and the upwardly extending push-button locking arm, the locking tabs moving into interlocking engagement with one another when the top of said bicycle chain cleaning tool is detachably connected to the bottom, said locking tabs moving out of said interlocking engagement with one another when said pushing force is applied to said push-button and said push-button release arm moves relative to and out of its releasable engagement by said push-button locking arm.

10. The combination recited in claim 1, wherein said push-button is surrounded by a push-button enclosure located at the top of said bicycle chain cleaning tool, said bicycle chain cleaning tool further including a spring lying between said push-button and said push-button enclosure, said spring being compressed when said at least one push-button release arm moves away from said at least one push-button locking arm in response to the pushing force applied to said push-button, and said spring expanding and urging said push-button release arm to move towards said push-button locking arm when the pushing force applied to said push-button is terminated.

11. The combination recited in claim 1, wherein the top of said bicycle chain cleaning tool has at least one locking edge extending from the rear thereof and the bottom of said cleaning tool has at least one locking edge guide standing upwardly from and bending over the rear thereof so that a locking edge receiving gap is created below said locking edge guide, the locking edge of said top being slidably and removably received within the locking edge receiving gap below the locking edge guide of said bottom when the top of said cleaning tool is detachably connected to the bottom.

12. A bicycle chain cleaning tool to be attached to a bicycle chain that is driven through said cleaning tool in response to a rotation of pedals of the bicycle, said bicycle cleaning tool comprising:
a top and a bottom, said top being detachably connected to said bottom around the bicycle chain;
at least one set of bristles located in one of the top or the bottom of said cleaning tool to engage and clean the bicycle chain;
a push-button located at the top of said cleaning tool and at least one push-button release arm depending downwardly from said push-button; and
at least one push-button locking arm standing upwardly at the bottom of said cleaning tool, whereby the top of said cleaning tool is detachably connected to the bottom such that the at least one push-button release arm is releasably engaged by the at least one push-button locking arm,
wherein there is a locking tab carried by each of the at least one push-button release arm and the at least one push-button locking arm, the locking tabs facing in opposite directions and moving into interlocking engagement with one another when the top of said bicycle chain cleaning tool is detachably connected to the bottom.

13. The bicycle chain cleaning tool in claim 12, wherein said push-button is responsive to a pushing force applied thereto for causing said at least one push-button release arm to move away from said at least one push-button locking arm so that the locking tab carried by the at least one push-button release arm is correspondingly moved out of its interlocking engagement with the locking tab carried by the at least one push-button locking arm to enable the top of said cleaning tool to be detached from the bottom.

14. The bicycle chain cleaning tool recited in claim 13, wherein said push-button is surrounded by a push-button enclosure located at the top of said cleaning tool, said bicycle chain cleaning tool further including a spring lying between said push-button and said push-button enclosure, said spring being compressed when said at least one push-button release arm moves away from said at least one push-button locking arm in response to the pushing force applied to said push-button, and said spring expanding and urging said push-button release arm to move towards said push-button locking arm when the pushing force applied to said push-button is terminated.

15. A combination comprising:
a bicycle having a front and rear and including pedals, a bicycle chain driven by a rotation of the pedals, a derailleur attached to the rear of the bicycle and having a drop down arm coupled to a rotatable gear over which the bicycle chain extends, and the drop down arm having an opening extending therethrough; and
a bicycle chain cleaning tool having a front end facing the pedals and an opposite rear end facing the derailleur and including:
at least one set of bristles, the bicycle chain moving through said cleaning tool so as to be engaged and cleaned by the at least one set of bristles in response to the rotation of the bicycle pedals; and
an attachment hook by which to attach said bicycle cleaning tool to the derailleur of the bicycle to prevent a displacement of said cleaning tool relative to the derailleur when the bicycle pedals are rotated in a first direction and the bicycle chain moves through said cleaning tool in a corresponding first direction, said attachment hook extending outwardly from the rear end of said bicycle chain cleaning tool and removably received within the opening through said drop down arm, whereby said attachment hook is attached to said derailleur.

16. The combination recited in claim 15, wherein the rear end of said bicycle chain cleaning tool has a depression extending inwardly thereof, said attachment hook being sized and received within the opening through said drop down arm to hold the derailleur within said depression so as to prevent said cleaning tool from being displaced toward the derailleur when the bicycle pedals are rotated in an opposite direction and the bicycle chain moves through said cleaning tool in said opposite direction.

* * * * *